A. SCHAARSCHMIDT.
KNIFE FOR MEAT CUTTING AND MINCING MACHINES.
APPLICATION FILED SEPT. 14, 1911.
1,015,403. Patented Jan. 23, 1912.
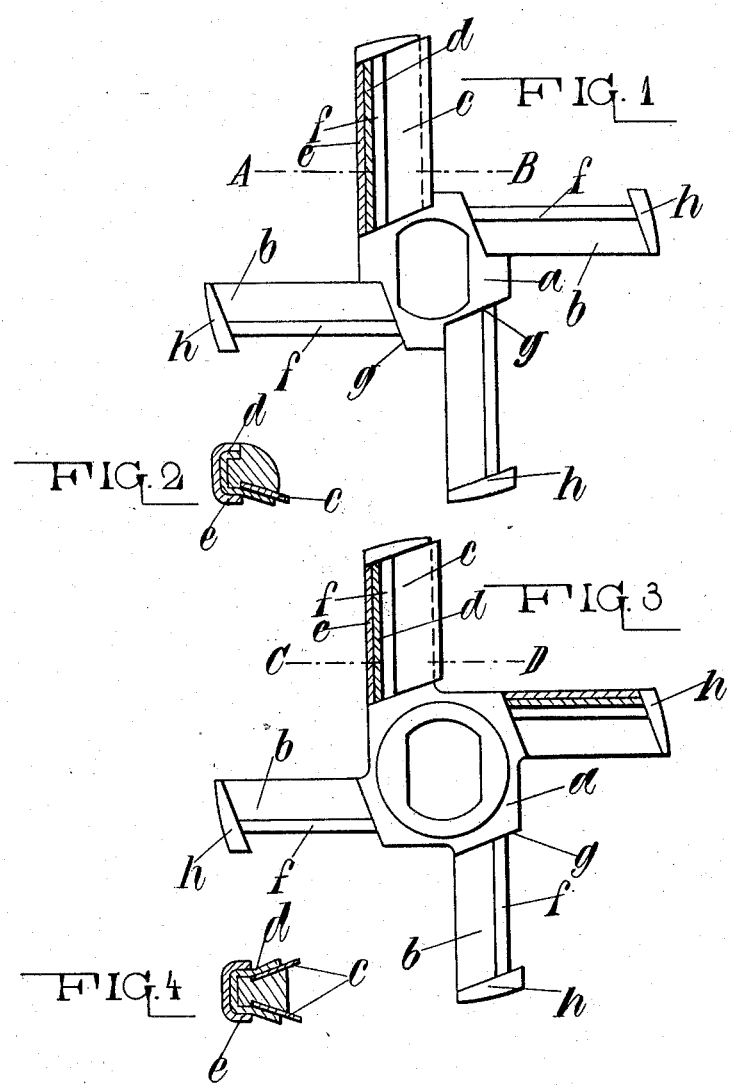

UNITED STATES PATENT OFFICE.

ALFRED SCHAARSCHMIDT, OF PLAUEN, GERMANY.

KNIFE FOR MEAT CUTTING AND MINCING MACHINES.

1,015,403.  Specification of Letters Patent.  Patented Jan. 23, 1912.

Application filed September 14, 1911. Serial No. 649,328.

*To all whom it may concern:*

Be it known that I, ALFRED SCHAARSCHMIDT, engineer, a subject of the King of Saxony, residing at 13 Beethovenstrasse, Plauen, Voigtland, Germany, have invented certain new and useful Improvements in Knives for Meat Cutting and Mincing Machines, of which the following is a specification, reference being had therein to the accompanying drawing.

The knives which have hitherto been employed in various constructions of meat cutting and mincing machines have generally the great disadvantage that they are liable to work themselves into the disks upon which they are arranged and as a result the knives wear very quickly and become blunt. This disadvantage arises partly from the reason that the knives are made of one piece of thick steel and also as stated on account of their working themselves into the disks so that the cutting edges or surfaces become broad. Such broad cutting surfaces cause much friction and require of course greater power and in spite of being tightly pressed upon the disk only make the cutting a very imperfect one. A further disadvantage is that if the disks are not absolutely plain, even sharply ground knives do not cut the meat but only squeeze or tear it off. According to this present invention these disadvantages are removed by mounting the knives or blades in resilient manner upon the arms of the knife body. The arrangement is preferably such that the knives are connected to their arms so as to be easily detached and that they are secured in their position upon the said arms (for example) by an elastic clamp which fits to the shape of the arms, which latter are provided with abutments preventing displacement of the knives toward either end. The employment of such knives results in a meat cutting and mincing machine which will meet all requirements.

I will now refer to the accompanying drawings which illustrate two examples of carrying out my invention.

Figure 1 is a side elevation, partly in section, of a knife body for single blades—one blade being shown. Fig. 2 is a section taken on line A—B of Fig. 1. Fig. 3 is a side elevation, partly in section, of a knife body, for double blades—two of the arms being fitted with blades, and Fig. 4 is a section on line C—D of Fig. 3.

According to the examples shown the knife carrying body $a$ has four star-like arms $b$. When using one-edged knives, these arms $b$ are preferably of such section as that shown in Fig. 2 while the blades $c$ are made from band-steel, sheet steel or any other suitable material and are secured to the arms $b$ by means of resilient or spring-like clamps $d$, $e$, which exactly fit to the cross section of the said arms to the back of which they are connected by screws, rivets or the like. The blades $c$ are inserted at the front between the arms $b$ and clamps $d$ and pushed back until they butt against the back of the arms which serve as stops. The front edge of the knives only slightly overlap the knife carrying arms. In order to prevent the blades moving lengthwise toward the top or the bottom, the arms $b$ are provided with abutments $g$, $h$.

Figs. 3 and 4 illustrate a two-edged knife for meat cutting and mincing machines, the knife being constructed by observing the same conditions as stated above. The advantages of this new knife in comparison with the known arrangements consist in that the blades, on account of their resiliency, always lie closely and under pressure against their coöperating disks, whether the latter are hollow, convex or plain. In this way a clean and perfect cutting it obtained. The moderate thickness of the blades prevents the edges becoming too broad and it is not necessary to press the knives with such force against the disks as is required with the hitherto used rigid knives. This results in the further advantage that the loss of energy occasioned by friction, is greatly reduced in such machines which thus work much more easily.

Having thus fully described my invention, what I claim is:

1. A meat cutting and mincing machine comprising a body adapted to be rotated, arms on said body, blades secured on said arms by resilient clamps and abutments at each end of said arms to prevent misplacement of said blades as described.

2. Meat cutting mechanism comprising a body adapted to be rotated, arms on said body, two blades on each of said arms and abutments on said arms to engage both ends of said blades for the purpose specified.

In testimony whereof I affix my signature in the presence of two witnesses.

ALFRED SCHAARSCHMIDT.

Witnesses:
F. L. ABRHSON,
CHARLES NEUER.